United States Patent
Alberts et al.

(10) Patent No.: US 11,905,932 B2
(45) Date of Patent: Feb. 20, 2024

(54) DEVICE AND METHOD OF CONTROLLING BLADE INSTABILITIES OF A WIND TURBINE TO AVOID BLADE FLUTTERING

(71) Applicant: Siemens Gamesa Renewable Energy A/S, Brande (DK)

(72) Inventors: Johannes Gerhardes Wardjan Alberts, Brøndby Strand (DK); Bjarne Skovmose Kallesøe, Bagsværd (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/928,017

(22) PCT Filed: May 21, 2021

(86) PCT No.: PCT/EP2021/063581
§ 371 (c)(1),
(2) Date: Nov. 28, 2022

(87) PCT Pub. No.: WO2021/244871
PCT Pub. Date: Dec. 9, 2021

(65) Prior Publication Data
US 2023/0220830 A1    Jul. 13, 2023

(30) Foreign Application Priority Data
Jun. 5, 2020  (EP) .................... 20178418

(51) Int. Cl.
*F03D 7/02*       (2006.01)
(52) U.S. Cl.
CPC ........ *F03D 7/0276* (2013.01); *F05B 2260/96* (2013.01); *F05B 2270/1011* (2013.01);
(Continued)

(58) Field of Classification Search
CPC .............. F03D 7/0276; F05B 2270/327; F05B 2270/404; F05B 2270/708; F05B 2270/1011
See application file for complete search history.

(56) References Cited

U.S. PATENT DOCUMENTS

| 10,316,822 B2 * | 6/2019 | Hoffmann ............. F03D 7/0276 |
| 2020/0263665 A1 * | 8/2020 | Dharmadhikari ..... F03D 7/0296 |

FOREIGN PATENT DOCUMENTS

| DE | 10 2016 000292 A1 | 7/2017 |
| DE | 10 2016 000294 A1 | 7/2017 |
| WO | 2019/212450 A1 | 11/2019 |

OTHER PUBLICATIONS

International Search Report and Written Opinion for PCT/EP2021/063581 dated Sep. 7, 2021.

* cited by examiner

*Primary Examiner* — Courtney D Heinle
*Assistant Examiner* — Danielle M. Christensen
(74) *Attorney, Agent, or Firm* — Schmeiser, Olsen & Watts LLP

(57) ABSTRACT

A device and a method of controlling blade instabilities of a wind turbine is provided. The method including the following steps: defining at least one preliminary overspeed threshold value; defining a fluttering rotor speed at and above which a predetermined fluttering of at least one of the blades occurs, the fluttering rotor speed is defined as a function of the pitch angle and/or as a function of the wind speed; setting a final overspeed threshold value to be equal to or smaller than a minimum rotor speed of the at least one preliminary overspeed threshold value and the fluttering rotor speed at the actual pitch angle and/or at the actual wind speed; and controlling the rotor speed to not exceed the final overspeed threshold value.

9 Claims, 2 Drawing Sheets

(52) U.S. Cl.
    CPC ... *F05B 2270/327* (2013.01); *F05B 2270/404* (2013.01); *F05B 2270/708* (2013.01)

DEVICE AND METHOD OF CONTROLLING BLADE INSTABILITIES OF A WIND TURBINE TO AVOID BLADE FLUTTERING

CROSS-REFERENCE TO RELATED APPLICATIONS

This application claims priority to PCT Application No. PCT/EP2021/063581, having a filing date of May 21, 2021, which claims priority to European Application No. 20178418.8, having a filing date of Jun. 5, 2020, the entire contents both of which are hereby incorporated by reference.

FIELD OF TECHNOLOGY

The following relates to a device and a method of controlling blade instabilities of a wind turbine to avoid blade fluttering.

BACKGROUND

FIG. 3 shows a graph of a fluttering speed F [RPM] of a rotor of a wind turbine and of safety overspeed threshold values $S_1$, $S_2$ [RPM] according to the conventional art. The allowable rotor speed or fluttering speed F, at and above which fluttering occurs (i.e., a tip speed depended aeroelastic instability and/or an oscillation of the blade tip with a certain amplitude and/or frequency along an axis of rotation), can be a graph correlating to parameters such as wind speed, pitch angle, rotor speed, etc. The fluttering speed F was usually sufficiently high and above the safety overspeed threshold value $S_1$, but recent blade optimizations resulted in a lowered fluttering speed F which falls below the safety system overspeed threshold $S_1$. As a consequence, the safety system overspeed threshold $S_1$ had to be lowered from $S_1$ to $S_2$ (for all wind speeds, pitch angles, etc.) to avoid conditions where fluttering might occur and the blade structural integrity could thus be at stake.

However, the lowering of the safety system overspeed threshold from $S_1$ to $S_2$ causes unnecessary shutdowns (false positives) in operation regions where fluttering would not occur anyhow, for example in mild fault scenarios. This will have a negative impact on availability, grid compliance and power production.

In an alternative approach, efforts have been made to increase the fluttering speed by changing the structural blade properties, which however resulted in a significantly increased blade masses/weights.

SUMMARY

An aspect relates to a device and a method of controlling blade instabilities of a wind turbine to avoid blade fluttering, where unnecessary shutdowns or structural modifications of the blades are reduced.

According to a first aspect of embodiments of the invention, a method of controlling blade instabilities of a wind turbine is provided. The wind turbine comprises a rotor having a plurality of rotor blades, the rotor being mounted to a nacelle to rotate about a rotation axis with a rotor speed, wherein each blade is configured to be pitched by a pitch angle about a pitch axis of the blade. The pitch axis is usually a longitudinal axis of the blade. The method comprises a step of defining at least one preliminary overspeed threshold value; defining a fluttering rotor speed at and above which a predetermined fluttering of at least one of the blades occurs, the fluttering rotor speed is defined as a function of the pitch angle and/or as a function of the wind speed; setting a final overspeed threshold value to be equal to or smaller than a minimum rotor speed of the at least one preliminary overspeed threshold value and the fluttering rotor speed at the actual pitch angle and/or at the actual wind speed; and controlling the rotor speed to not exceed the final overspeed threshold value. The wind speed determining device can be a wind speed detector. However, the wind speed can also indirectly be estimated based on other parameters than the wind speed.

In an embodiment, the final overspeed threshold value is acquired from a lookup table as the function of the at least one preliminary overspeed threshold value, the actual pitch angle and/or the actual wind speed.

In an embodiment, the at least one preliminary overspeed threshold value is dynamically changed based on a predetermined parameter or based on a predetermined event. The predetermined event can be a shutdown event or a high wind speed condition, for example. The at least one preliminary overspeed threshold value, which for example initiates a shutdown, can depend on the pitch angle and/or the wind speed and/or a speed reference (target rotor speed). Then the action, the safety system or control device can take, can either be a shutdown or curtailing the rotor speed. This can apply for both a primary layer of protection (for example implemented by a controller monitor/control device of the wind turbine) and a secondary layer of protection (for example implemented by an external hardware outside the wind turbine).

In an embodiment, the at least one preliminary overspeed threshold value includes: a first preliminary overspeed threshold value which is provided from a hardware outside the wind turbine such as from an external safety system; and/or a second preliminary overspeed threshold value which is provided from an internal control device of the wind turbine. The final overspeed threshold value is set to be equal to or smaller than a minimum rotor speed of at least one of the first preliminary overspeed threshold value and the second preliminary overspeed threshold value, and of the fluttering rotor speed at the actual pitch angle and/or at the actual wind speed. For example, the second preliminary overspeed threshold value, which is provided from the internal control device of the wind turbine, can be used in a primary layer of protection, and the first preliminary overspeed threshold value, which is provided from the hardware outside the wind turbine such as from the external safety system, can be used in a secondary layer of protection.

According to a second aspect of embodiments of the invention, a control device is provided, which is configured to control blade instabilities of a wind turbine. The wind turbine comprises a rotor having a plurality of rotor blades, the rotor being mounted to a nacelle to rotate about a rotation axis with a rotor speed, wherein each blade is configured to be pitched by a pitch angle about a pitch axis of the blade. The control device is configured to set a final overspeed threshold value to be equal to or smaller than a minimum rotor speed of at least one preliminary overspeed threshold value and a fluttering rotor speed, at and above which a predetermined fluttering of at least one of the blades occurs. The fluttering rotor speed is defined as a function of the pitch angle and/or as a function of the wind speed; and the control device is configured to control the rotor speed to not exceed the final overspeed threshold value.

Also here, the predetermined fluttering condition may cause a tip speed depended aeroelastic instability, and it may occur when there is an oscillation or vibration of the at least one blade with a certain amplitude and/or frequency along the axis of rotation. The predetermined fluttering condition can also be defined by any other condition.

In an embodiment, the control device is configured to access a lookup table where the final overspeed threshold value is defined as a function of the at least one preliminary overspeed threshold value, the actual pitch angle and/or the actual wind speed.

In an embodiment, the at least one preliminary overspeed threshold value dynamically changes based on a predetermined parameter or based on a predetermined event.

In an embodiment, the at least one preliminary overspeed threshold value includes: a first preliminary overspeed threshold value which is provided from a hardware outside the wind turbine such as from an external safety system; and/or a second preliminary overspeed threshold value which is provided from the control device of the wind turbine. The control device is configured to set the final overspeed threshold value to be equal to or smaller than a minimum rotor speed of at least one of the first preliminary overspeed threshold value and the second preliminary overspeed threshold value, and of the fluttering rotor speed at the actual pitch angle and/or at the actual wind speed.

According to a third aspect of embodiments of the invention, a wind turbine comprises the above-mentioned control device.

According to embodiments of the present invention, the object discussed above is achieved by adjusting the overspeed threshold (for both or one of the safety systems and the controller monitor) based on the pitch angle and/or the wind speed. The above discussed disadvantages of the conventional art are overcome. In the conventional art, the overspeed threshold has been lowered which resulted in an increased number of shutdowns which impaired the availability, power production and grid compliance (e.g., a grid 'low-voltage ride through' (LVRT) or a 'grid fault ride through' (GFRT), both requiring a standby operation).

Alternative conventional art efforts tried to strengthen the blade structure to increase the fluttering speed, which was expensive and increased the mass/weight of the blades and the entire supporting structure, and therefore the loads. For example, blade bolts were not able to withstand the fatigue loads and needed to be increased in size, which in turn increased the hub size, the nacelle-hub interface, the bedframe and therefore tower and foundation of the wind turbine.

Embodiments of the present invention overcome these disadvantages by correlating the fluttering to the pitch angle (or wind speed) so that the overspeed threshold is lowered only in that specific region of operation where a fluttering behavior is hazardous. At the same time, this specific region of operation is also the region where the risk of a shutdown after gust events or LVRTs/GFRTs is nearly non-existent. As a result, the structural integrity and the safety of the turbine are improved under low costs and nearly without any loss of availability and power production. The risk of blade damages in the field is reduced, so that possible costs of blade repairs, warranty cases, etc. are also reduced. Eventually, the entire wind turbine costs can be reduced due to lighter structural components that carry the lighter blade.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with reference to the following figures, wherein like designations denote like members, wherein.

DETAILED DESCRIPTION

Figure 1:
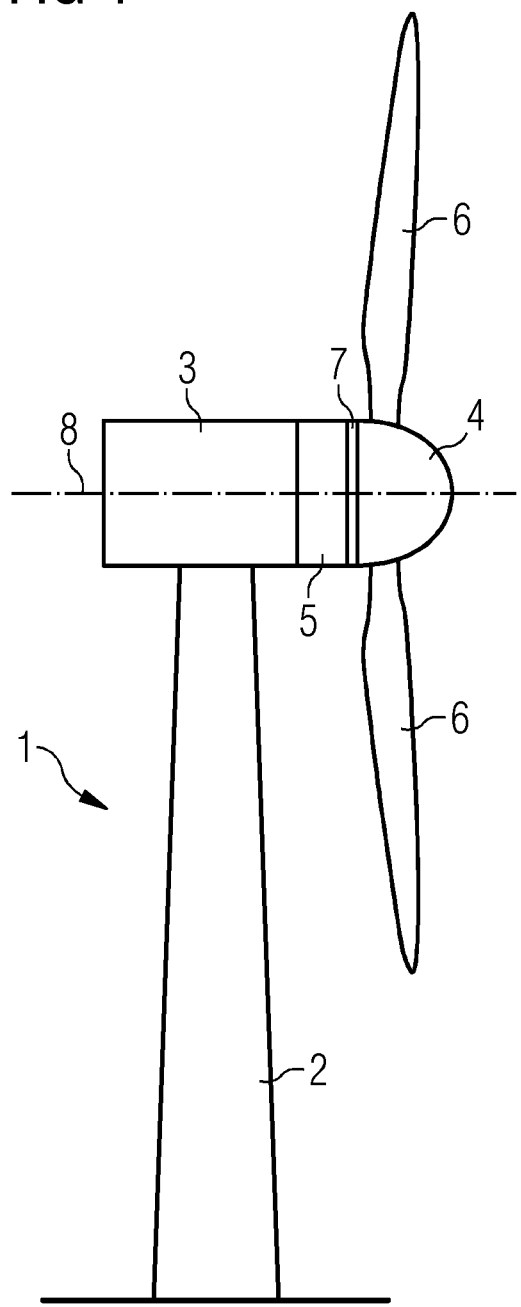
FIG. 1 shows a wind turbine and the different elements thereof.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by a yaw bearing. The axis of rotation of the nacelle 3 with regard to the tower 2 is referred to as the yaw axis.

The wind turbine 1 also comprises a rotor 4 with three rotor blades 6 (of which two rotor blades 6 are depicted in FIG. 1). Each blade 6 is configured to be pitched by a pitch angle about a pitch axis of the blade 6. The pitch axis of the blade 6 is usually the longitudinal axis of the blade 6. The pitching is usually performed by a pitch actuator. The rotor 4 is mounted rotatable with regard to the nacelle 3 by a main bearing 7. The rotor 4 is mounted rotatable about a rotation axis 8.

The wind turbine 1 furthermore comprises a generator 5. The generator 5 in turn comprises a rotor 10 connecting the generator 5 with the rotor 4. The rotor 4 is connected directly to the generator 5, thus the wind turbine 1 is referred to as a gearless, direct-driven wind turbine. Such a generator 5 is referred as direct drive generator 5. As an alternative, the rotor 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the rotor 4 into electrical energy in the shape of an AC power.

Figure 2:
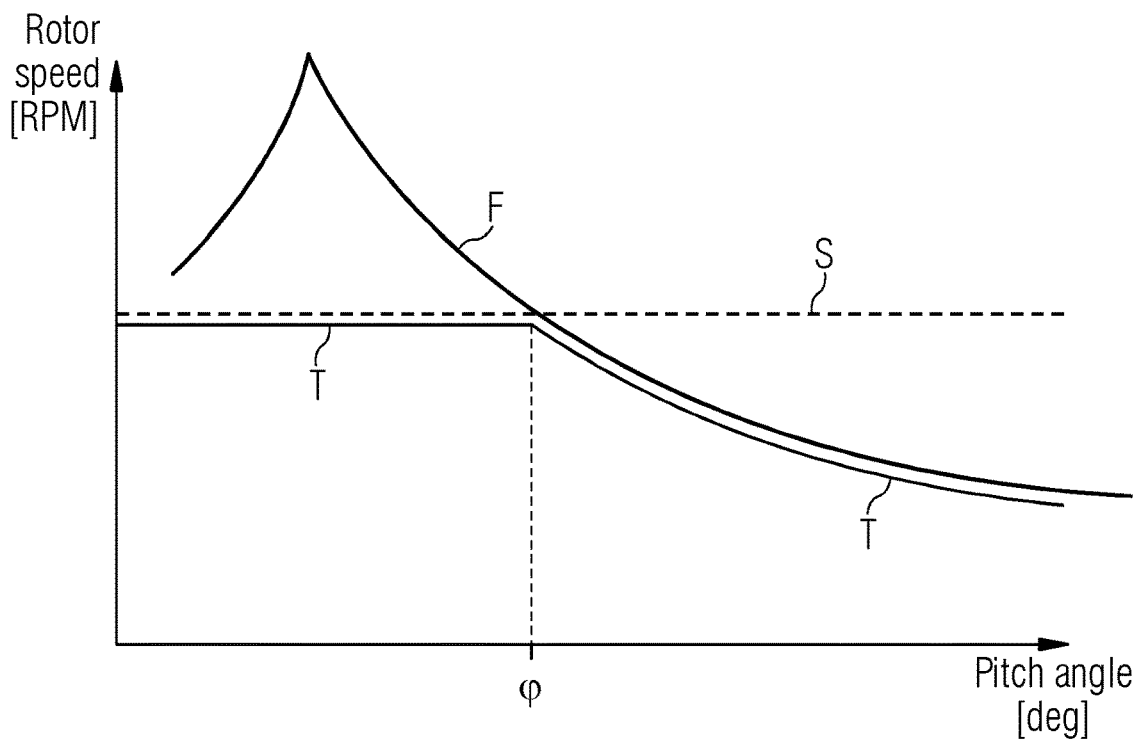
FIG. 2 shows a graph of a target rotor speed as a function of the pitch angle according to an embodiment.
Figure 3:
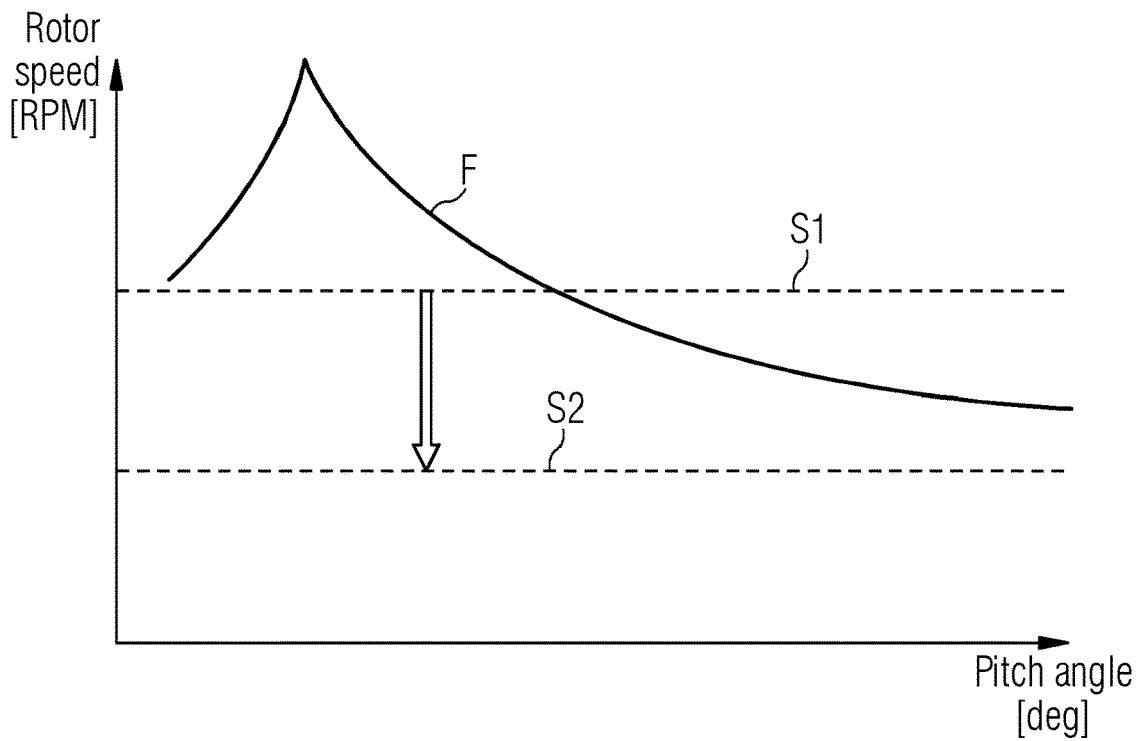
FIG. 3 shows a graph of a fluttering speed and of safety overspeed threshold values according to the prior art.

FIG. 2 shows a graph of a target rotor speed as a function of the pitch angle according to an embodiment and describes a method of controlling blade instabilities of the wind turbine 1.

The method comprises a step of defining a fluttering rotor speed F at and above which a predetermined fluttering condition of at least one of the blades 6 occurs. The fluttering condition can be indicated by an oscillation of the at least one blade 6 with a certain amplitude and/or frequency, for example along the axis of rotation 8.

As shown in FIG. 2, the fluttering rotor speed F is defined as a function of the pitch angle. In the embodiment of FIG. 2, the graph of the fluttering rotor speed F is composed of two different curves, i.e., the curve at the left-hand side in FIG. 2 is ascending, and the curve at the right-hand side in FIG. 2 is descending. Both curves intersect each other at an apex. The graph in FIG. 2 is just an example; as a matter of course, the graph of the fluttering rotor speed F can have different shapes.

The method further comprises a step of defining a first overspeed threshold value S in the shape of a safety overspeed threshold value S, which is usually a straight horizontal line so that the safety overspeed threshold value S is a fixed value against any pitch angle. However, the safety overspeed threshold value S in FIG. 2 is just an example; as a matter of course, the safety overspeed threshold value S can have any shape. For example, the safety overspeed threshold value S can also be a function of the pitch angle and/or a function of the wind speed.

The method further comprises a step of setting a final overspeed threshold value T to be equal to or smaller than a minimum rotor speed of the at least one preliminary overspeed threshold value S and the fluttering rotor speed F at the actual pitch angle; and a step of controlling the rotor speed to not exceed the final overspeed threshold value T.

In the embodiment of FIG. 2, the graph of the fluttering rotor speed F intersects the safety overspeed threshold value S in an intersection point at a pitch angle φ. As a result, the final overspeed threshold value T corresponds to the safety overspeed threshold value S for pitch angles being smaller than φ, and the final overspeed threshold value T corresponds to the fluttering rotor speed F for pitch angles being greater than φ.

The final overspeed threshold value T can be acquired from a lookup table as the function of the at least one preliminary overspeed threshold value S and the actual pitch angle.

In a modified embodiment, the safety overspeed threshold value S can dynamically be changed based on a predetermined parameter or based on a predetermined event. The predetermined event can be a shutdown event or a high wind speed condition, for example.

In the above-described embodiment, the at least one preliminary overspeed threshold value S includes the first preliminary overspeed threshold value S (also referred as safety overspeed threshold value S) which can be provided from a hardware outside the wind turbine 1 such as from an external safety system. The first preliminary overspeed threshold value S can be used in a so-called secondary layer of protection.

Instead of or in addition to the safety overspeed threshold value S, the at least one preliminary overspeed threshold value can include a second preliminary overspeed threshold value which is provided from an internal control device of the wind turbine 1. The second preliminary overspeed threshold value can be used in a so-called primary layer of protection.

If the at least one preliminary overspeed threshold value only includes the second preliminary overspeed threshold value, which is provided from the internal control device of the wind turbine 1, wherein the final overspeed threshold value T is set to be equal to or smaller than a minimum rotor speed of the second preliminary overspeed threshold value and the fluttering rotor speed F at the actual pitch angle.

Otherwise, if the at least one preliminary overspeed threshold value includes both the first preliminary overspeed threshold value (for example the safety overspeed threshold value S), which is provided from a hardware outside the wind turbine 1 such as from an external safety system, and the second preliminary overspeed threshold value, which is provided from the internal control device of the wind turbine 1, the final overspeed threshold value T is set to be equal to or smaller than a minimum rotor speed of the first preliminary overspeed threshold value S, the second preliminary overspeed threshold value, and the fluttering rotor speed F at the actual pitch angle.

The embodiments above can be modified in that the fluttering rotor speed F (and thus also the final overspeed threshold value T) of the rotor 4 is a function of an actual wind speed determined by a wind speed determining device (not shown), instead of being a function of the pitch angle. The embodiments above can also be modified in that the fluttering rotor speed F (and thus also the final overspeed threshold value T) of the rotor 4 is a function of the pitch angle and a function of the actual wind speed determined by a wind speed determining device, instead of being a function of only the pitch angle. The wind speed determining device can be a wind speed detector. However, the wind speed can also indirectly be estimated based on other parameters than the wind speed.

The method above can be implemented in a control device (not shown) which is configured to control blade instabilities (and a rotor speed) of a wind turbine 1, wherein the control device is configured to set a final overspeed threshold value T to be equal to or smaller than a minimum rotor speed of at least one preliminary overspeed threshold value S and a fluttering rotor speed F, at and above which a predetermined fluttering of at least one of the blades 6 occurs, wherein the fluttering rotor speed F is defined as a function of the pitch angle and/or as a function of the wind speed. The control device is configured to control the rotor speed to not exceed the final overspeed threshold value.

The control device can be configured to access a lookup table where the final overspeed threshold value T is defined as a function of the at least one preliminary overspeed threshold value S, the actual pitch angle and/or the actual wind speed.

The safety overspeed threshold value S can dynamically be changed based on a predetermined parameter or based on a predetermined event, for example a shutdown event or a high wind speed condition.

The at least one preliminary overspeed threshold value can include the first preliminary overspeed threshold value S which can be provided from a hardware outside the wind turbine 1 such as from an external safety system. Alternatively, or in addition, the at least one preliminary overspeed threshold value can include a second preliminary overspeed threshold value which is provided from the control device of the wind turbine 1. The control device is configured to set the final overspeed threshold value T to be equal to or smaller than a minimum rotor speed of at least one of the first preliminary overspeed threshold value S and the second preliminary overspeed threshold value, and of the fluttering rotor speed F at the actual pitch angle and/or at the actual wind speed.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling blade instabilities of a wind turbine, the wind turbine comprising a rotor having a plurality of rotor blades, the rotor being mounted to a nacelle to rotate about a rotation axis with a rotor speed, wherein each blade is configured to be pitched by a pitch angle about a pitch axis of the blade, the method comprising:
- defining at least one preliminary overspeed threshold value;
- defining a fluttering rotor speed at and above which a predetermined fluttering of at least one of the blades occurs, the fluttering rotor speed is defined as a function of the pitch angle and/or as a function of the wind speed;
- setting a final overspeed threshold value to be equal to or smaller than a minimum rotor speed of the at least one preliminary overspeed threshold value and the fluttering rotor speed at an actual pitch angle and/or at an actual wind speed; and
- controlling the rotor speed to not exceed the final overspeed threshold value.

2. The method according to claim 1, wherein the final overspeed threshold value is acquired from a lookup table as a function of the at least one preliminary overspeed threshold value, the actual pitch angle and/or the actual wind speed.

3. The method according to claim 1, wherein the at least one preliminary overspeed threshold value is dynamically changed based on a predetermined parameter or based on a predetermined event.

4. The method according to claim 1, wherein the at least one preliminary overspeed threshold value includes:
- a first preliminary overspeed threshold value which is provided from a hardware outside the wind turbine; and/or
- a second preliminary overspeed threshold value which is provided from an internal control device of the wind turbine; wherein the final overspeed threshold value is set to be equal to or smaller than a minimum rotor speed of at least one of the first preliminary overspeed threshold value and the second preliminary overspeed threshold value, and of the fluttering rotor speed at the actual pitch angle and/or at the actual wind speed.

5. A control device configured to control blade instabilities of a wind turbine, the wind turbine comprising a rotor having a plurality of rotor blades, the rotor being mounted to a nacelle to rotate about a rotation axis with a rotor speed, wherein each blade is configured to be pitched by a pitch angle about a pitch axis of the blade, wherein,
- the control device is configured to set a final overspeed threshold value to be equal to or smaller than a minimum rotor speed of at least one preliminary overspeed threshold value and a fluttering rotor speed, at and above which a predetermined fluttering of at least one of the blades occurs, the fluttering rotor speed is defined as a function of the pitch angle and/or as a function of the wind speed; and
- the control device is configured to control the rotor speed to not exceed the final overspeed threshold value.

6. The control device according to claim 5, wherein the control device is configured to access a lookup table, where the final overspeed threshold value is defined as a function of the at least one preliminary overspeed threshold value, an actual pitch angle and/or an actual wind speed.

7. The control device according to claim 5, wherein the at least one preliminary overspeed threshold value dynamically changes based on a predetermined parameter or based on a predetermined event.

8. The control device according to claim 5, wherein the at least one preliminary overspeed threshold value includes:
- a first preliminary overspeed threshold value which is provided from a hardware outside the wind turbine; and/or
- a second preliminary overspeed threshold value which is provided from the control device; wherein the control device is configured to set the final overspeed threshold value to be equal to or smaller than a minimum rotor speed of at least one of the first preliminary overspeed threshold value and the second preliminary overspeed threshold value, and of the fluttering rotor speed at an actual pitch angle and/or at an actual wind speed.

9. A wind turbine comprising the control device according to claim 5.

* * * * *